US006883557B1

(12) United States Patent
Eschbach et al.

(10) Patent No.: US 6,883,557 B1
(45) Date of Patent: Apr. 26, 2005

(54) METHOD FOR WEAVING AN AIRBAG

(75) Inventors: Thomas Eschbach, Rheinheim (DE); Michael Becker, Zell im Wiesental (DE)

(73) Assignee: Berger Seiba-Technotex Verwaltungs GmbH Co., Bad Sackingen (DE)

( * ) Notice: Subject to any disclaimer, the term of this patent is extended or adjusted under 35 U.S.C. 154(b) by 0 days.

(21) Appl. No.: 10/668,614

(22) Filed: Sep. 23, 2003

Related U.S. Application Data

(63) Continuation of application No. PCT/EP02/03629, filed on Apr. 2, 2002.

(30) Foreign Application Priority Data

Mar. 30, 2001 (DE) ........................................ 101 15 890

(51) Int. Cl.[7] ................................................ D03D 1/04

(52) U.S. Cl. ............................. 139/387 R; 139/384 R; 139/389; 139/420 R; 280/728; 280/743 R

(58) Field of Search ......................... 139/383 R, 384 R, 139/387 R, 389, 410, 413, 420 R, 426 R; 280/728, 733, 743, 728 R, 743 R; 428/232, 258, 259, 287, 112

(56) References Cited

U.S. PATENT DOCUMENTS 4,025,684 A * 5/1977 Neidhardt .................. 442/206
5,275,434 A * 1/1994 Hirabayashi et al. .... 280/743.1
5,465,999 A * 11/1995 Tanaka et al. .............. 280/733
5,865,464 A * 2/1999 Kanuma et al. ......... 280/743.1
6,022,817 A * 2/2000 Lewis et al. ................ 442/189
6,074,701 A * 6/2000 Beasley, Jr. ................. 427/384
6,112,775 A * 9/2000 Hossli et al. ........... 139/383 R
6,135,488 A * 10/2000 Bosio et al. ............. 280/728.1
6,283,507 B1 * 9/2001 Kami et al. .............. 280/743.1
6,419,263 B1 * 7/2002 Busgen et al. .............. 280/733
6,439,601 B1 * 8/2002 Iseki .......................... 280/733
6,698,790 B1 * 3/2004 Iseki et al. .................. 280/733
6,713,412 B1 * 3/2004 Newbill ...................... 442/218

OTHER PUBLICATIONS

International Search Report for PCT/EP02/03629, dated Mar. 8, 2002, 3 pages.

* cited by examiner

*Primary Examiner*—John J. Calvert
*Assistant Examiner*—Robert H. Muromoto, Jr.
(74) *Attorney, Agent, or Firm*—Harness, Dickey & Pierce, P.L.C.

(57) ABSTRACT

The available fabric mass in the one-piece woven airbag as tailorized by the method, now makes it possible to reinforce the airbag fabric individually oriented. Thus, at a high stress location formerly exhibiting airbag tears, a fabric quality is now available of enhanced resistance, achieved among other things by an increase in the thermal capacity in the neuralgic locations of the airbag where namely the jet lances feature their so-called jet gill zone.

8 Claims, 1 Drawing Sheet

METHOD FOR WEAVING AN AIRBAG

CROSS-REFERENCE TO RELATED APPLICATIONS

This application is a continuation of PCT/EP02/03629, filed Apr. 2, 2002 which claims priority to DE 101 15 890.4, filed Mar. 30, 2001, both of which are incorporated by reference herein.

BACKGROUND AND SUMMARY OF THE INVENTION

The invention relates to a method for broad loom machine weaving an at least two-ply, one-piece airbag.

One-piece woven (OPW) airbags are known which find application in the fabrication of vehicular airbag systems. For inflation of such one-piece woven airbags a gas lance is inserted thereinto. Experience has shown tears materializing in the regions of the airbag in which gas is jetted into the airbag from the gas lance. Gas lances often feature a train of slots, so-called gills, oriented roughly transversely to the gas flow, through which the gas is jetted into the airbag at several locations. The aforementioned tears in the airbag may materialize e.g. because of differences in the design of the inflator, causing it to be more or less aggressive, termed dispersion within and between inflator jets. Tears in the airbag may also be influenced by the positioning of the jet gills relative to the airbag chamber. In addition, airbag tears more frequently occur in borderline situations as regards inflator aggressiveness as well as the ambient temperature at which the airbag is put to use.

The object of the invention is to propose a method for weaving an at least two-ply, one-piece airbag in which the drawbacks as known from prior art, particularly tears in the fabric occuring in the region of the gas flow jetted into an airbag, no longer occur or are at least very greatly reduced.

This object is achieved by a method as it reads from claim 1. The available fabric mass in the one-piece woven airbag as tailorized by the method, now makes it possible to reinforce the airbag fabric individually oriented. Thus, at a high stress location formerly exhibiting airbag tears, a fabric quality is now available of enhanced resistance, achieved among other things by an increase in the thermal capacity in the neuralgic locations of the airbag where namely the jet lances feature their so-called jet gill zone. Now, by increasing the fabric mass to advantage in desired airbag positions in the fabric, a higher strength both mechanically and also thermally is available in preventing tears in the airbag.

In one aspect of the invention a weft yarn is employed in the desired region which as compared to standard yarn has an at least 25% higher dtex. The invention will now be detained with reference to the drawing for a better understanding, in which:

DETAILED DESCRIPTION

Figure 1A:
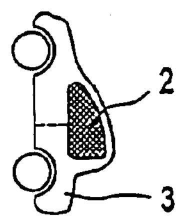
FIG. 1*a* is a diagrammatic arrangement of a vehicular airbag.
Figure 1:
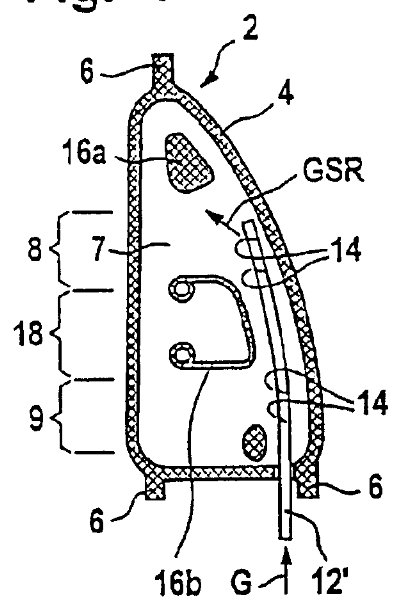
FIG. 1 is a greatly diagrammatic illustration of an airbag which in this case is a vehicular side airbag extending over the side windows of the right-hand front and rear seat of the vehicle.

Referring now to FIG. 1 there is illustrated diagrammatically, by way of example, an airbag 2 shown from the side. The location of this airbag 2 in a motor vehicle may be imagined for the right-hand side windows of a vehicle shown on the move in the upper part (FIG. 1*a*) of the drawing. The airbag 2 is framed by a single-ply woven edge 4 shown shaded in the drawing. In accordance with its location in the vehicle, tabs 6 arranged "front" and "rear" serve to secure the airbag 2 in place (not shown). The position of the airbag 2 in a vehicle 3 is indicated diagrammatically in FIG. 1*a*. The airbag 2 is divided into various regions, namely a front seat region 8 and a rear seat region 9 in which, in case of a collision, the head of a vehicle occupant could impact the side window of the vehicle. This is why the airbag 2 needs to be inflated at the earliest in the cited regions 8 and 9. For inflating the airbag a gas lance 12 is inserted into the interior 7 of the airbag 2, the gas lance 12 comprising jet orifices 14 in the regions 8 and 9. The gas is jetted into the cited regions roughly in the direction of an arrow GSR and is then distributed in the airbag. The shaded edge 4 of the airbag 2 is, as just said, woven single-ply whilst the interior 7 framed by the edge 4 is woven two-ply in this example. Some regions within the airbag 2 serving particularly to shape the airbag 2 or orient the flow of gas into the airbag 2 are included in the weave single-ply woven as connecting regions in the form of surface areas 16*a* or webs 16*b*. Thus, for example, in the vicinity of the so-called A-pillar (not shown) and B-pillar (likewise not shown) of the vehicle a region 16*a* and a webbed region 16*b* respectively are woven single-ply. In these regions 16*a*, 16*b* upper and lower fabric plies are joined to each other.

The fabric as is usually configured rather fine for an airbag is subjected to exceptionally heavy stress in the region of the jet orifices 14 of the gas lance 12 unlike other regions of the airbag 2. The shock of the hot gas jet stresses the surface or fabric of the airbag exceptionally in the corresponding regions.

Figure 2:
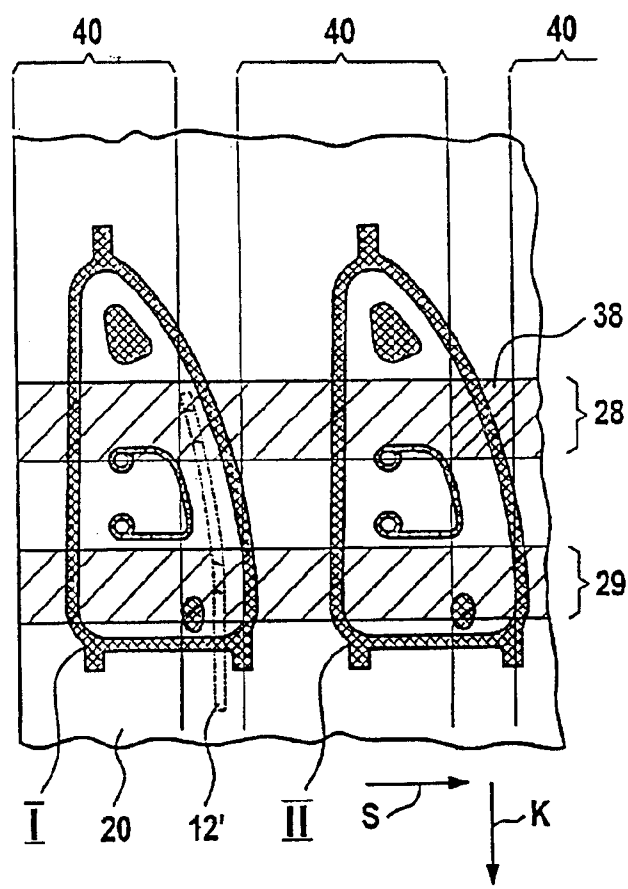
FIG. 2 is again a greatly diagrammatic illustration of part of a fabric in which two airbags are evident one alongside the other fully woven on the machine.

Referring now to FIG. 2 there is illustrated part of a fabric 20 in which two inwoven airbags I and II are evident. In this case the airbags I and II are shown not yet parted from the fabric 20. Indicated in airbag I is an inserted jet lance 12' depicted by the dotted line which analog to the jet lance 12 as shown in FIG. 1 comprises jet orifices arranged in the regions 8 and 9. The fabric 20 in the example as shown in this case is basically woven single-ply in the non-shaded region located outside of the airbags I and II. The requirement in this case is substantially a woven structure and thus there is no need to go into detail as regards the connections. What is particularly of interest in the fabric 20 as shown in FIG. 2 is the special use made of weft threads differing in dtex. A weft thread in the direction of the arrow S transversely to the warps running in the direction of the arrow K is picked, for example, over the full width of the fabric 20 as shown here merely sectionwise. To attain higher strength in the wall of the airbag 2 in the regions 8 and 9 as cited above, regions of the airbag offering greater resistance are created in accordance with the invention (FIG. 2) in the regions 28 and 29 by employing a yarn VS in the cited regions in the weft direction S and which as compared to weft threads used in other regions of the fabric 20 has a 25% higher dtex, for instance. This so-called reinforcement weft yarn VS is picked, for example with no change in the weft set, into the fabric 20 so that in the regions 28 and 29 a corresponding increase in the fabric mass and thus the desired fabric strength is achieved. This inventive approach attains, on the one hand, the desired reinforcement where it is wanted within a ply of the airbag, but, on the other hand, the reinforcement effect is also achieved elsewhere in the airbag where not required. This may result in the stiffness of the airbag as well as the pack volume of airbag being unfavorable in some assembly conditions.

This situation can be improved by selecting in the reinforcement regions 28 and 29 a weft sequence in which reinforcement weft yarns VS differing in dtex, for example by alternating 470 with 350 dtex reinforcement weft threads in a predefined sequence. This permits reducing the stiffness and thus also the pack volume of the airbag as compared to that of an airbag woven with just one reinforcement weft thread dtex. On top of this, any surfeit in the regions of the fabric (i.e. the fabric may form advance cloth, indeed even folds, in approaching the absolute limit to the fabric density that can be accommodated, when only a single reinforcement weft thread dtex with no change in the weft set is employed) is reduced.

In optimizing the procedure as just described in which the reinforcement weft yarn VS reinforcing the full width of the fabric in the regions 28 and 29 is picked, the reinforcement weft yarn VS is picked only in defined regions transversely in the fabric. To prevent the reinforcement regions from extending over the full width of the fabric, i.e. over the full "height" of the airbag, the reinforcement wefts VS are activated only in defined regions (identified by the reference numeral 38 in FIG. 2) in which the inflow of gas is actually anticipated through the jet orifices 14 of the gas lance 12 on inflation of the airbag.

Figure 3:
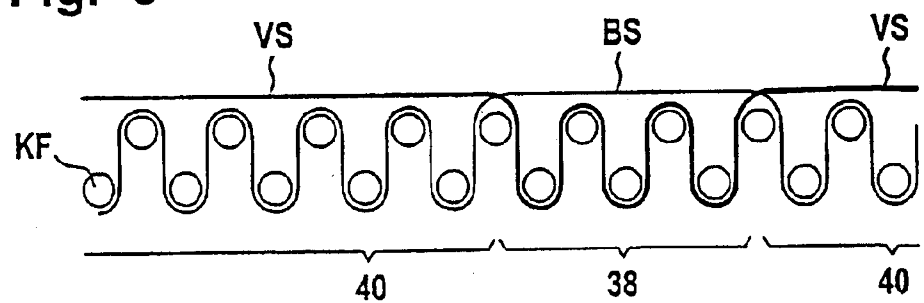
FIG. 3 is a greatly diagrammatic illustration of a cross-section through one ply of an airbag in which weft threads of differing dtex are woven.

Referring now to FIG. 3 there is illustrated how, in this procedure a reinforcement weft thread VS (depicted merely diagrammatically) is picked in the fabric only in the region 38 whilst outside thereof it is present as a floating reinforcement weft also outside of the fabric. Analogous to the location of the reinforcement weft VS a basic weft thread BS runs in the region 38 floating outside of the fabric 20, whilst in the remaining regions of the fabric it is interwoven into the plies of the fabric conventionally.

Evident likewise from FIG. 3, shown in section, are the warp threads KF which together with the basic weft thread BS and reinforcement weft thread VS form a ply of the airbag 2. It will be understood that the illustration as shown in FIG. 3 is merely diagrammatic and not at all true to scale. The person skilled in the art will recognize from the diagrammatic illustration the various principles and weaves of different weft and warp threads involved. In the regions 40 the reinforcement thread VS is located floating, whilst in the region 38 the basic weft thread is located floating outside of the fabric. To advantage the reinforcement weft threads VS may furthermore be parted on the machine in the floating regions so that they actually remain only in the desired regions 38 of the fabric 20. This procedure has many advantages. The fabric is reinforced only in the regions in which stress is anticipated whilst the pack volume is reduced practically to that of the standard fabric. Likewise, the stiffness of the airbag is minimized.

The method in accordance with the invention also covers, of course, a method for weaving an air tube for a so-called airbelt, in other words an inflatable seat belt. It is of advantage with such air tubes when particularly elastic weft threads, e.g. monofil threads, are picked in regions of the fabric desired to be particularly elastic. Thus, regions in the fabric required to have "only" an airbag function in the finished airbelt, may be woven with very fine, soft weft threads whilst other regions having "also" an airbelt function are woven at least in part with monofil threads in thus making for enhanced cost effectiveness and more function-specific airbelt fabrication.

It will be understood that the above description gives no details as to how the remaining regions of the airbag (single-ply region, two-ply region, etc) are woven in kind, since these basics are known to the person skilled in the art. Also, implementing the method in accordance with the invention by ways and means as described above is intended merely to be appreciated as an example. Employing a Jacquard weaving machine permits discrete localized interweaving of reinforcement weft threads in making use of the "picked weft technology" as just described with all of its advantages as likewise described. Just as possible too, is the arrangement of further juxtaposed airbags in a fabric web.

What is claimed is:

1. A method for machine weaving an at least two-ply, one-piece airbag or air tube comprising:

weaving weft threads of differing dTex in at least one ply and, picking said weft threads only in predetermined warp thread length regions, and interweaving part of said weft threads only in predetermined and non-overlapping overlapping width regions of the airbag.

2. The method as set forth in claim 1 further comprising non-interwoven regions of said weft threads are parted from the airbag or air tube as just woven in the weaving machine.

3. The method as set forth in claim 1 further comprising picking, on the one hand, standard weft threads of a first dtex and, on the other, reinforcement weft threads having a second, more particularly at least 25% higher dtex.

4. The method as set forth in claim 3 further comprising picking said weft threads having the second, higher dtex with no change in the weft set.

5. The method as set forth in claim 1 further comprising employing monofil threads as said weft threads.

6. A method for manufacturing an inflatable safety device, the method comprising:

(a) weaving threads of a lower dTex value in a first area;

(b) weaving threads of a higher dTex value in a second area; and (c) weaving threads of the higher dTex value in a third area;

wherein the first area is located between the second and third areas, the second and third areas not overlapping each other.

7. A method for manufacturing an airbag or passenger restraint air tube, the method comprising:

(a) weaving a first reinforced area at a first gas inflation location;

(b) weaving a second reinforced area at a second gas inflation location, the first and second locations being in fluid communication with each other, and (c) weaving a non-reinforced area between the inflation locations.

8. An inflatable safety device comprising:

(a) threads of a lower dTex value in a first area;

(b) threads of a higher dTex value in a second area; and (c ) threads of the higher dTex value in a third area;

wherein the first area is located between the second and third areas, the second and third areas not overlapping each other;

wherein the material is more easily folded in the first area as compared to the second and third areas.

* * * * *